(12) United States Patent
Marcet (10) Patent No.: US 11,301,409 B2
(45) Date of Patent: Apr. 12, 2022

(54) INPUT/OUTPUT MODULES

(71) Applicant: Hewlett-Packard Development Company, L.P., Spring, TX (US)

(72) Inventor: Sebastien Marcet, Grenoble (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 2 days.

(21) Appl. No.: 16/500,108

(22) PCT Filed: Jan. 19, 2018

(86) PCT No.: PCT/US2018/014442
§ 371 (c)(1),
(2) Date: Oct. 2, 2019

(87) PCT Pub. No.: WO2018/186926
PCT Pub. Date: Oct. 11, 2018

(65) Prior Publication Data
US 2021/0103542 A1    Apr. 8, 2021

(30) Foreign Application Priority Data

Apr. 7, 2017    (EP) ..................................... 17305413

(51) Int. Cl.
*G06F 13/40*    (2006.01)

(52) U.S. Cl.
CPC ........ *G06F 13/409* (2013.01); *G06F 13/4068* (2013.01)

(58) Field of Classification Search
CPC ............................ G06F 13/409; G06F 13/4068
See application file for complete search history.

(56) References Cited

U.S. PATENT DOCUMENTS

| | | | |
|---|---|---|---|
| 4,083,633 | A | 4/1978 | Shanly |
| 5,027,315 | A | 6/1991 | Agrawal et al. |
| 7,350,984 | B1 | 1/2008 | Togami et al. |
| 8,074,022 | B2 | 12/2011 | Okin et al. |
| 10,283,920 | B2 * | 5/2019 | Chung ............... H01R 13/7039 |
| 10,826,256 | B2 * | 11/2020 | Chen ........................ G06F 1/266 |
| 2005/0135844 | A1 | 6/2005 | Takenouchi |
| 2006/0025018 | A1 | 2/2006 | Dube et al. |

(Continued)

FOREIGN PATENT DOCUMENTS

| | | |
|---|---|---|
| CN | 101493800 | 9/2009 |
| CN | 102393672 | 3/2012 |

(Continued)

OTHER PUBLICATIONS

Modifying I/O ports, 2008.

*Primary Examiner* — Henry Tsai
*Assistant Examiner* — Christopher A Daley
(74) *Attorney, Agent, or Firm* — Michael A. Dryja (57) ABSTRACT

An Input/Output, I/O, module comprising a module body, a first connector disposed on a first part of the module body, and an I/O port disposed on a second part of the module body and electrically connected to the first connector. The I/O module is locatable in a module slot of an electronic device such that the first connector couples to a second connector of the module slot to electrically connect, the I/O port to the electronic device. A corresponding electronic device is also disclosed.

13 Claims, 10 Drawing Sheets

(56) References Cited

U.S. PATENT DOCUMENTS

| | | | | |
|---|---|---|---|---|
| 2006/0067063 A1* | 3/2006 | Stahl | ................ | H05K 7/1409 |
| | | | | 361/754 |
| 2008/0236866 A1* | 10/2008 | Kim | ................ | H01R 27/02 |
| | | | | 174/113 R |
| 2013/0331035 A1* | 12/2013 | Wu | ................ | H04B 7/24 |
| | | | | 455/41.2 |
| 2014/0055928 A1* | 2/2014 | Lee | ................ | G06F 1/1632 |
| | | | | 361/679.01 |
| 2014/0156897 A1 | 6/2014 | Reinke et al. | | |

FOREIGN PATENT DOCUMENTS

| | | |
|---|---|---|
| EP | 2878448 B1 | 2/2020 |
| GB | 2116911 A | 4/1983 |
| WO | WO-2008121572 | 10/2008 |
| WO | WO-2013126209 A1 | 8/2013 |

\* cited by examiner

INPUT/OUTPUT MODULES

BACKGROUND

Many types of Input/Output ports and connectors are known and variously used in electronic devices. Users of Retail Point of Sale, RPOS, devices in particular often need devices with certain Input/Output (I/O) ports to ensure compatibility with existing peripherals. At some point, they may wish to upgrade to peripherals using different, or more modern I/O ports. Such users may face a choice between purchasing entirely new RPOS devices and persisting with legacy peripherals. More generally, current RPOS devices provide limited I/O flexibility and it may be the case that manufacturers have to make available multiple different versions of RPOS devices for customers with different needs.

Although the need for I/O flexibility is particularly seen in RPOS devices, it will be appreciated that this may apply to electronic devices in general. The examples described below may therefore relate to any electronic devices and are not limited to RPOS devices.

BRIEF INTRODUCTION OF THE DRAWINGS

Examples of the disclosure are further described hereinafter with reference to the accompanying drawings, in which.

DETAILED DESCRIPTION

Figure 1:
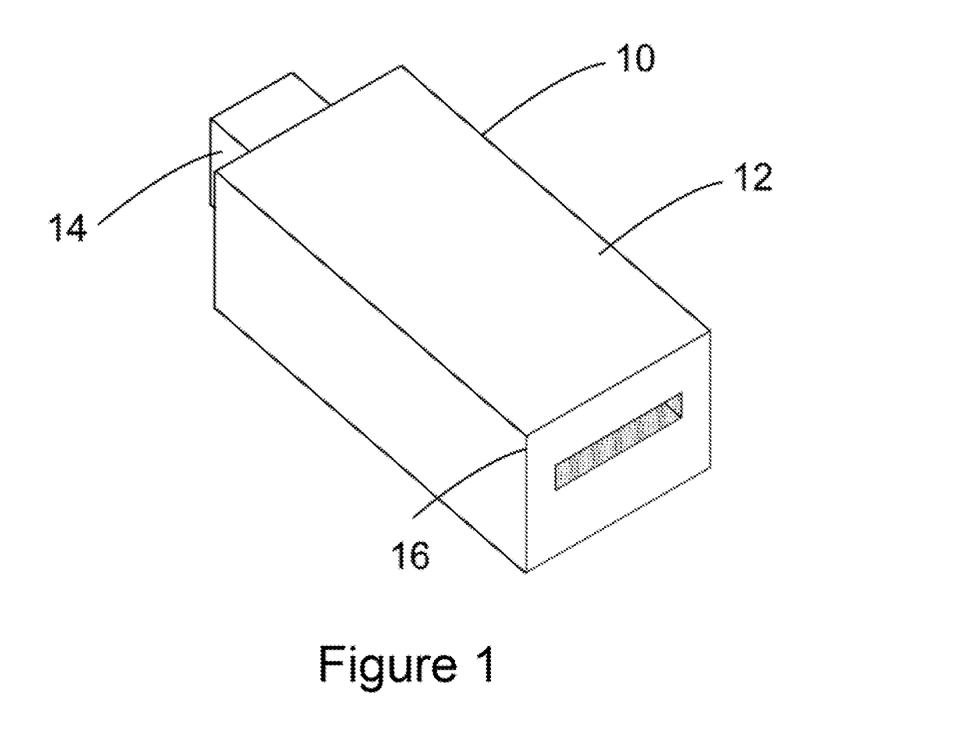
FIG. 1 shows a diagram of an example I/O module.

FIG. 1 shows a schematic diagram of an example I/O module 10. As shown in FIG. 1, the I/O module 10 may comprise a module body 12, a first connector 14 disposed on a first part of the module body 12, and an I/O port 16 disposed on a second part of the module body 12. The first connector 14 may be electrically connected to the I/O port 16 so that I/O signals may be passed between the first connector 14 and the I/O port 16. The I/O module 10 may be locatable in a module slot 22 of an electronic device 20 (shown in FIG. 2) such that the first connector 14 may couple to a second connector 24 of the module slot 22 to electrically connect the I/O port 16 to the electronic device 20. That is, I/O signals may pass from the I/O port 16 to the first connector 14, from the first connector 14 to the second connector 24, and from the second connector 24 to the electronic device 20. I/O signals may also pass in the other direction; that is, I/O signals may pass from the electronic device 20 to the second connector 24, from the second connector 24 to the first connector 14, and from the first connector 14 to the I/O port 16.

The I/O ports 16 may be powered serial ports, powered USB ports, USB ports, HDMI ports. Thunderbolt ports, but it will be appreciated that these are merely examples and any other type of I/O port may be used, including any types of I/O ports that are developed in the future. It will also be appreciated that the I/O port 16 may comprise a plurality of I/O ports. Electrical connections may therefore be made to the electronic device 20 through the I/O port 16 when the I/O module 10 is located in a module slot 22 such that the first connector 14 is coupled to a second connector 24.

Figure 2:
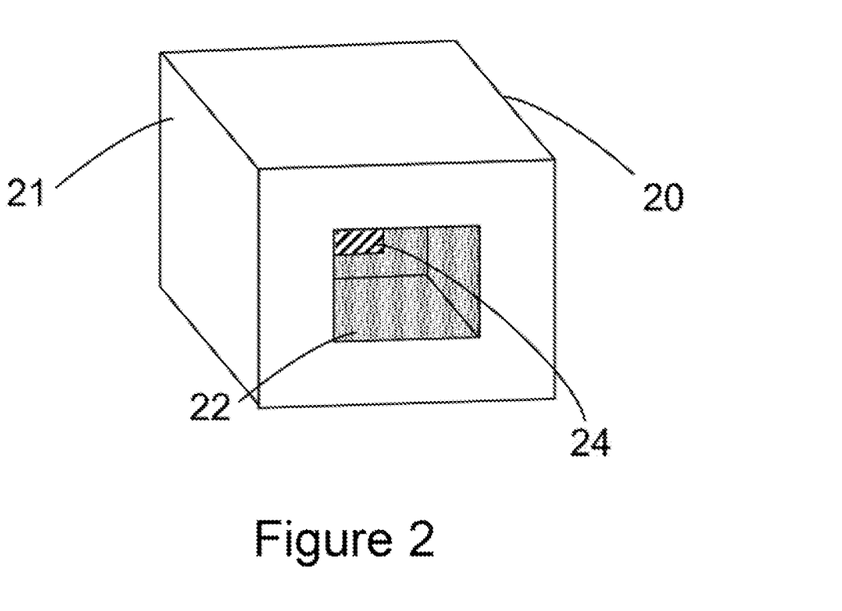
FIG. 2 shows a diagram of an example electronic device.

FIG. 2 shows a diagram of an example electronic device 20. As shown in FIG. 2, the electronic device 20 may comprise a device body 21 and a module slot 22 disposed on a first part of the device body 21. The module slot 22 may incorporate a second connector 24. An I/O module 10 may be receivable in the module slot 22. The I/O module 10 may be as described above in relation to FIG. 1. That is, the I/O module 10 may comprise a module body 12, a first connector 14 disposed on a first part of the module body 12 to couple to the second connector 24, and an I/O port 16 disposed on a second part of the module body 12 and electrically connected to the first connector 14 such that the I/O port 16 is electrically connected to the electronic device 20 when the I/O module 10 is received in the module slot 22. That is, if the I/O module 10 is received in the module slot 22, the first connector 14 may couple to the second connector 24 to electrically connect the I/O port 16 to the electronic device 20 such that I/O signals may be passed between the I/O port 16 and the electronic device 20.

Figure 3:
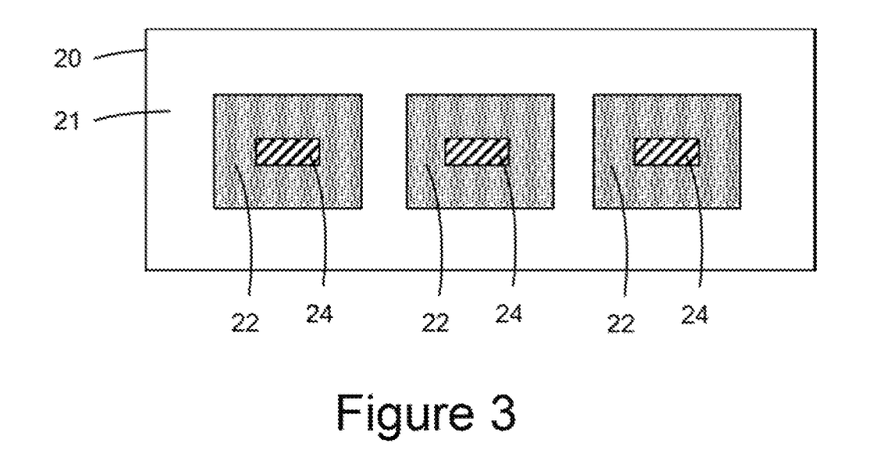
FIG. 3 shows a diagram of an example electronic device.

FIG. 3 shows a diagram of an example electronic device 20. As shown in FIG. 3, the electronic device 20 may comprise a plurality of module slots 22. Each module slot 22 may incorporate a second connector 24. The plurality of module slots 22 may each incorporate the same type of second connector 24. This may reduce the number of types of I/O module 10 that need to be produced, thereby reducing complexity for the manufacturer and consumer. Alternatively, in some examples, some of the module slots 22 may incorporate different types of second connector 24. That is, some of the module slots 22 may incorporate second connectors 24 of a first type, some of the module slots 22 may incorporate second connectors 24 of a second type, and so on.

Figure 4:
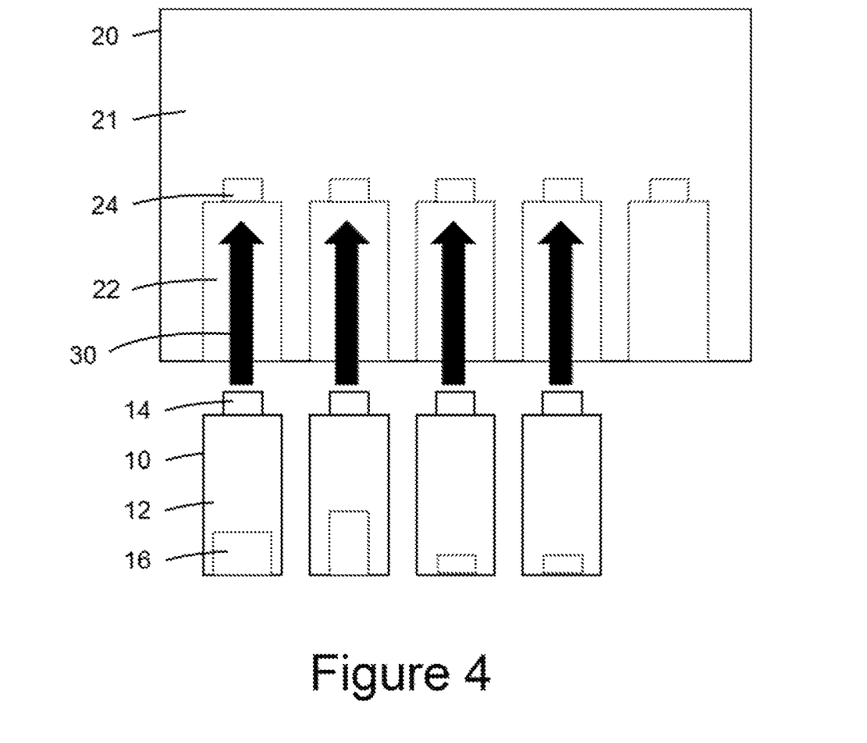
FIG. 4 shows a diagram of example I/O modules and an example electronic device.

FIG. 4 shows a schematic diagram of a system comprising example I/O modules 10 and an example electronic device 20. It will be appreciated that the system may comprise only a single I/O module 10. As shown in FIG. 4, an electronic device 20 may receive one or more I/O modules 10, and the I/O modules 10 may comprise I/O ports 16 of multiple types. That is, each I/O module 10 may comprise a different type of I/O port 16, some I/O modules 10 may have the same types of I/O port 16, or all I/O modules 10 may have the same types of I/O port 16. The I/O modules 10 may be inserted into the module slots 22 as indicated by arrows 30.

By locating I/O modules 10 in the module slots 22 of the electronic device 20, increased I/O flexibility may be provided and a user of electronic device 20 may easily adapt the electronic device 20 according to their needs. As shown in FIG. 4, an I/O module 10 need not be located in every module slot 22. That is, any number of module slots 22 may receive I/O modules 10, according to the user's needs. Although FIG. 4 shows five module slots 22, it will be appreciated that this is merely an example, and any number of module slots 22 may be provided.

Figure 5:
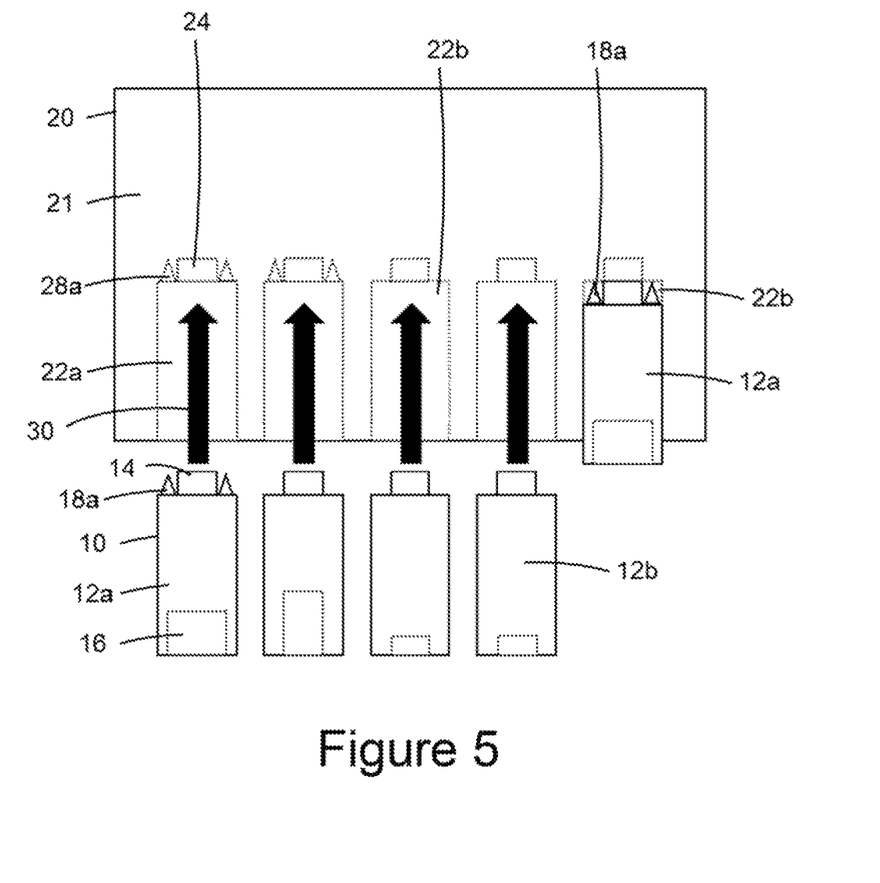
FIG. 5 shows a diagram of examples of a first type of module body and a second type of module body of example I/O modules and examples of a first type of module slot and second type of module slot of an example electronic device.
Figure 6:
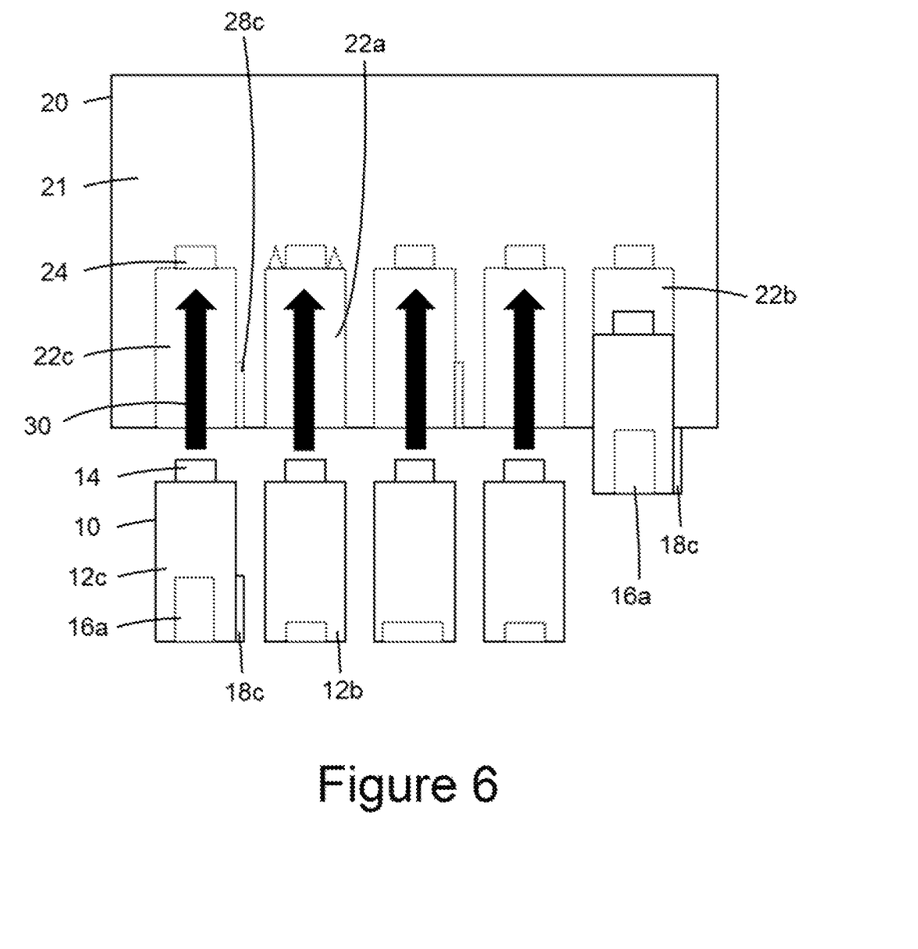
FIG. 6 shows a diagram of an example of a third type of module body of example I/O modules and an example of a third type of module slot of an example electronic device.
Figure 7:
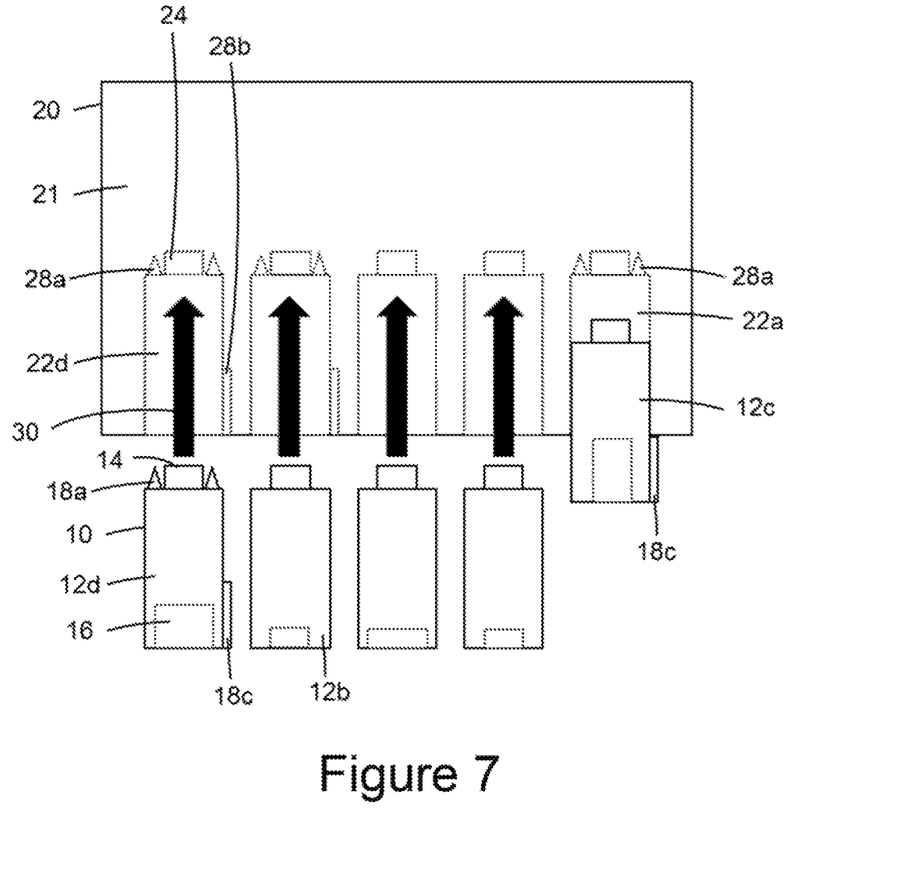
FIG. 7 shows a diagram of an example of a fourth type of module body of example I/O modules and an example of a fourth type of module slot of an example electronic device.

FIGS. 5, 6, and 7 show schematic diagrams of examples of different types of I/O modules 10 and different types of module slots 22 of example electronic devices 20. The different types of modules and module slots 22 are differentiated by different physical shapes and may be used to prevent certain numbers or combinations of I/O modules 10.

FIG. 5 shows a diagram of examples of a first type of module body 12a and a second type of module body 12b of example I/O modules 10 and examples of a first type of module slot 22a and a second type of module slot 22b of an example electronic device 20. As shown in FIG. 5, an I/O module 10 may have a shape to be received in a first type of module slot 22a and to prevent its insertion or full depth insertion into a second type of module slot 22b. For example, at least one module slot 22 of the electronic device 20 may comprise a first type of module slot 22a and at least one module slot 22 may comprise a second type of module slot 22b, wherein the first type of module slot 22a has a shape to fit a first type of module body 12a of an I/O module 10, and wherein the second type of module slot 22b has a shape to not fit the first type of module body 12a. It is to be understood that if a module body 12 has a shape to fit a module slot 22 (or vice versa) then the I/O module 10 can be located in the module slot 22 such that the first connector 14 may couple to the second connector 24, and if full insertion of the module body 12 into the slot 22 is prevented then the first connector 14 may not couple to the second connector 24.

As illustrated in FIG. 5, the first type of module body 12a may comprise pins 18a and the first type of module slot 22a may comprise pin holes 28a to fit pins 18a. By "pins" and "holes" it will be understood that there is at least one protrusion arranged to mate with a complementary recess. The effect of pins 18a and pin holes 28a is that I/O modules 10 comprising pins 18a may be locatable in a module slot 22a such that the first connector 14 may couple to the second connector 24 when the module slot 22a comprises the pin holes 28a. Furthermore, I/O modules 10 comprising pins 18a may not be locatable in a module slot 22b such that the first connector 14 may couple to the second connector 24 when the module slot 22b does not comprise pin holes 28a. However, an I/O module 10 comprising a module body 12 without pins 18a, which may be referred to as comprising a second type of module body 12b, may be locatable in a module slot 22 such that the first connector 14 may couple to the second connector 24 even when the module slot 22 comprises pin holes 28a.

Different types of module bodies 12, in combination with different types of module slots 22, may therefore limit the number of I/O modules 10 with certain types of module body 12 that may be located in module slots 22 of the electronic device 20. This may be used, for example, to limit the number of I/O modules 10 with a first type of I/O port 16a that may be used with the electronic device 20. For example, as illustrated in FIG. 5, an electronic device 20 may comprise two of the first type of module slot 22a and three of the second type of module slots 22b. If I/O modules 10 with a first type of I/O port 16a comprise a first type of module body 12a, then a maximum of two first type of I/O ports 16a may be electrically connected to the electronic device 20. This may be used to limit the amount of power that may be provided through the electronic device 20 by limiting the amount of high power I/O ports 16 that may be connected to the electronic device, for example. It will be appreciated that pins 18a and pin holes 28a are merely one example of how the shapes of the module body 12 and module slot 22 can be differentiated to create a first type of module body 12a and first type of module body 22a and that any other suitable modifications to the shapes of the module body 12 and module slot 22 could be used.

FIG. 6 shows a diagram of an example of a third type of module body 12c of example I/O modules 10 and an example of a third type of module slot 22c of an example electronic device 20. As illustrated in FIG. 6, in some examples a third type of module slot 22c and a third type of module body 12c may be used. For example, at least one module slot 22 may comprise a third type of module slot 22c, wherein the third type of module slot 22c has a shape to fit a third type of module body 12c of an I/O module 10 and wherein the third type of module slot 22c has a shape to not fit the first type of module body 12a. As illustrated in FIG. 6, the third type of module body 12c may comprise peg 18c or side protrusion and the third type of module slot 22c may comprise peg slot 28c or channel to fit peg 18c. As illustrated in FIG. 6, the effect of the second type of peg 18c and peg slot 28c is similar to the effect of pins 18a and pin holes 28a. As illustrated in FIG. 6, different types of module slot 22 of the electronic device 20 may have different shapes to fit different shapes of different types of module body 12. The use of additional types of module bodies 18 and module slots 22 may provide additional flexibility in limiting the combinations of different types of I/O ports 16 which may be connected to electronic device 20. Although the third type of module body 12c and third type of module slot 22c are illustrated as being differentiated from the first and second types by the peg 18c and peg slot 28b respectively, it will be appreciated that these are just examples and any shapes of module body 12 and module slot 22 may be used.

FIG. 7 shows a diagram of an example of a fourth type of module body 12d of example I/O modules 10 and an example of a fourth type of module slot 22d of an example electronic device 20. As illustrated in FIG. 7, in some examples a fourth type of module body 12d and fourth type of module slot 22d may be used. For example, at least one module slot 22 may comprise a fourth type of module slot 22d, wherein the fourth type of module slot 22d has a shape to fit the first type of module body 12a and the third type of module body 12c. As illustrated in FIG. 7, the fourth type of module body 12d may comprise pins 18a and peg 18c and the fourth type of module slot 22d may comprise pin holes 28a and peg slot 28c. As illustrated in FIG. 7, the fourth type of module slot 22d may be a universal module slot 22 which may have a shape to fit the first, second, third and fourth types of module body 12a-12d. The fourth type of module body 12d may have a shape to not fit any type of module slot 22 except the fourth type of module slot 22d.

Figure 8:
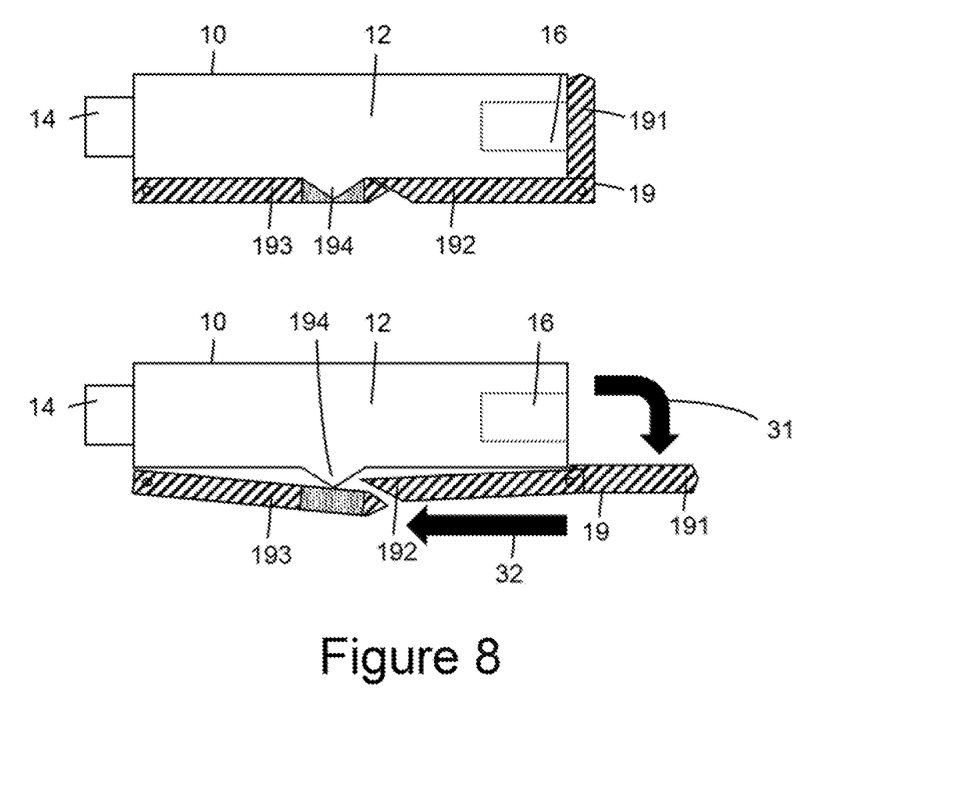
FIG. 8 shows a diagram of an example securing mechanism of an example I/O module.
Figure 9:
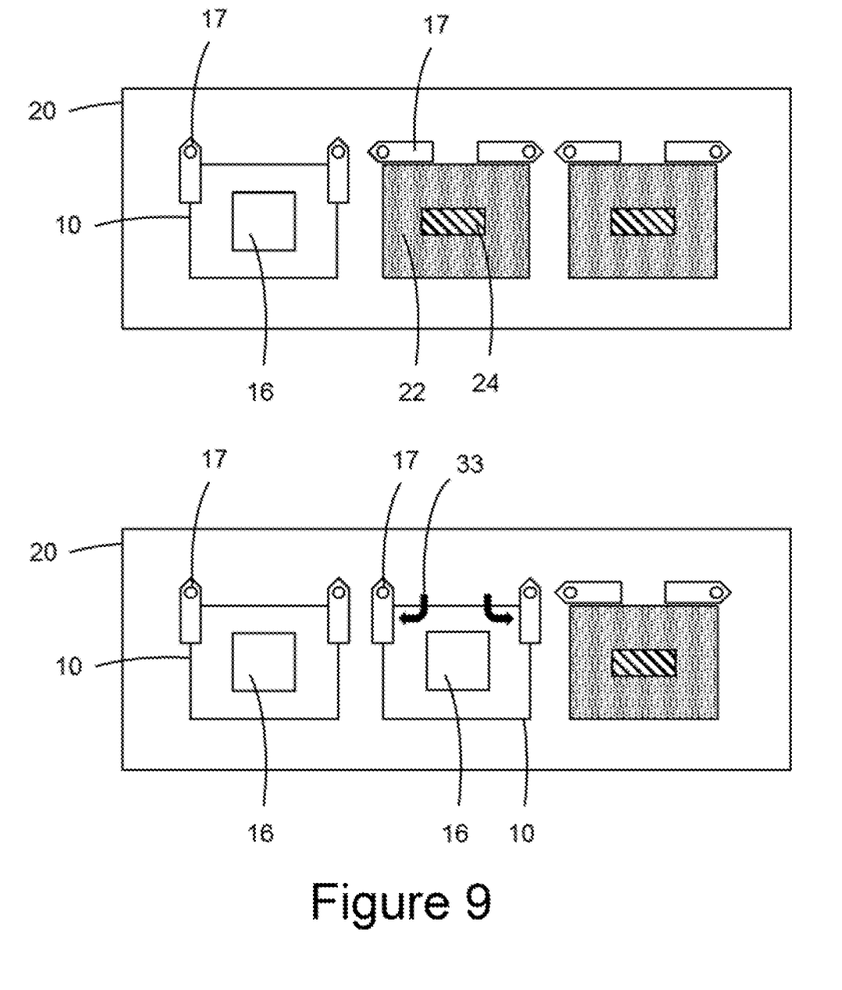
FIG. 9 shows a diagram of an example securing mechanism of an example electronic device.

As illustrated in FIGS. 5, 6, and 7, the use of different types of module body 12 and module slot 22 may provide maximum I/O flexibility while preventing undesirable combinations of I/O ports 16 in an electronic device 20. FIGS. 8 and 9 show diagrams of example securing mechanisms of an example I/O module 10 and an example electronic device 20. The securing mechanism may be any suitable mechanism for reversibly securing the I/O module 10 in a module slot 22 of the electronic device 20, for instance a latching mechanism 19 similar to the latching mechanism of an SFP port may be used, as shown in FIG. 8. FIG. 8 is a cross sectional view of a module 10 inserted in a module slot 22, where a latch part of the module slot 22 is illustrated. The upper part of FIG. 8 shows the latch In a locked state and the lower part of FIG. 8 shows the latch in an unlocked state In the illustrated example, the latching mechanism 19 may be unlocked by folding down the latch 191 as indicated by arrow 31 to actuate a locking member 192 as indicated by arrow 32. The latch 191 is attached to the module 10 by a pivot at the lower right corner, which equates to an edge of the module 10 at the outer end of the module slot 22. Rotation of the latch causes translational movement of the locking member 192 along the module 10. The module slot 22 includes locking member 193 which in the locked state is shaped to fit a protrusion 194 on a corresponding side of the module 10 to restrict the module 10 from being removed from the module slot 22. Translation movement of module locking member 192 causes the module slot 193 to be deflected away from protrusion 194 of the module 10 and so the module 10 can be removed from the slot 22. The latching mechanism 19 illustrated in FIG. 8 has a small footprint and does not need the use of a tool. However, it will be appreciated that this is merely an example, and any suitable securing mechanism 17 could be used. For example, a clip mechanism or screwing mechanism may be used, or screw holes may be provided in the I/O module 10 and electronic device 20 to allow the I/O module 10 to be screwed to the electronic device 20. The use of screws may more securely hold the I/O module in the module slot 22. It will be appreciated that the securing mechanism 17 may be implemented entirely in the I/O modules 10 entirely in the electronic device 20, or may be implemented between the I/O modules 10 and the electronic device 20. That is, the I/O module 10 may comprise a securing mechanism 17 to hold the I/O module within a module slot 22 of the electronic device 22 and/or the electronic device 20 may comprise a securing mechanism 17 to hold an I/O module 10 in a module slot 22.

If the electronic device 20 comprises a securing mechanism 17, each module slot 22 may have its own securing mechanism 17, or a single securing mechanism 17 may be implemented across a plurality of module slots 22. FIG. 9 shows a diagram of an example securing mechanism 19 of an example electronic device 20. For example, as illustrated in FIG. 9, each module slot 22 may have a securing mechanism 17 comprising a plurality of rotatable members which may be rotated as indicated by arrows 33 to secure an I/O module 10 in the module slot 22.

Figure 10:
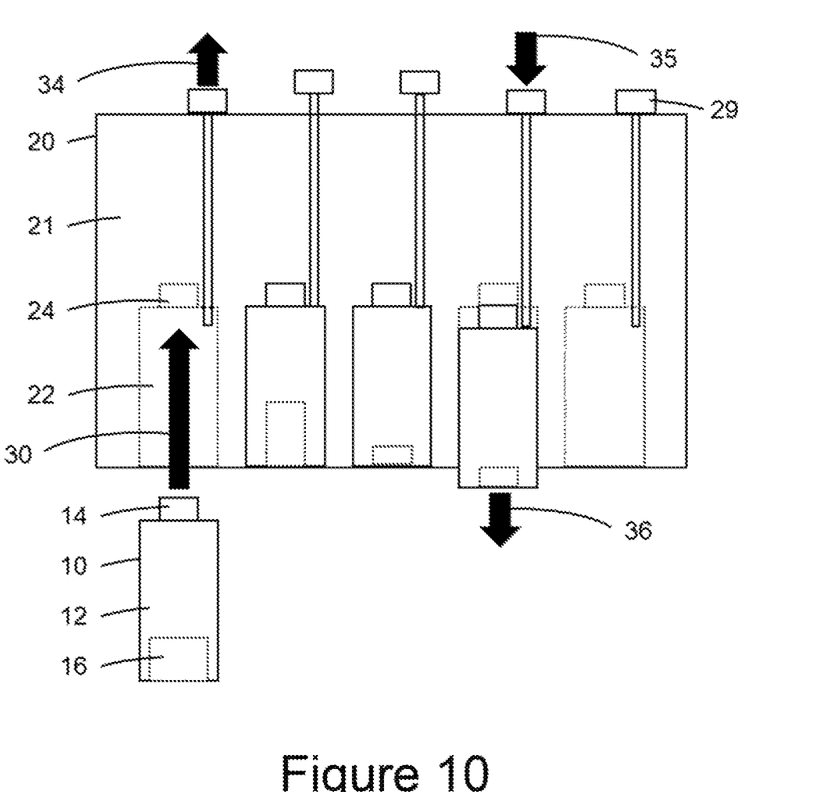
FIG. 10 shows a diagram of an example ejection mechanism of an example electronic device.

FIG. 10 shows a diagram of an example ejection mechanism 29 of an example electronic device 20. As illustrated in FIG. 10, the electronic device 20 may comprise an ejection mechanism 29 to eject an I/O module 10 from a module slot 22. In the example illustrated in FIG. 10, the ejection mechanism 29 may comprise a lever to enable the user to push an I/O module 10 out of a module slot 22, as indicated by arrows 35 and 36. When an I/O module 10 is located in a module slot 22, as indicated by arrow 30, the lever may be pushed out of the device body 21, as indicated by arrow 34. An ejection mechanism 29 may be helpful if the length of the module body 12 is the same as, similar to, or less than the length of the module slot 22, so that it might otherwise be difficult or impossible for the user to grip and extract the module body 12 when the I/O module 10 is located in a module slot 22. That is, the I/O module 10 may be sized to fit entirely within the module slot 22 when located in the module slot 22 and/or the module slot 22 may be sized so that the I/O module 10 fits entirely within the module slot 22 when the I/O module 10 is received in the module slot 22. It will be appreciated that the ejection mechanism 29 illustrated in FIG. 10 is merely an example and that any suitable mechanism to enable a user to eject I/O modules 10 from module slots 22 may be used. It will be appreciated that the ejection mechanism 29 may be implemented entirely in the I/O modules 10, entirely in the electronic device 20, or may be implemented across the I/O modules 10 and the electronic device 20. That is, the I/O module 10 may comprise an ejection mechanism 29 to eject the I/O module 10 from a module slot 22 of an electronic device 20 and/or an electronic device 20 may comprise an ejection mechanism 29 to eject an I/O module 10 from a module slot 22. If the electronic device 20 comprises the ejection mechanism 29, each module slot 22 may comprise its own ejection mechanism 29, or a single ejection mechanism 29 may be implemented across a plurality of module slots 22. In some examples, the ejection mechanism 29 may comprise the securing mechanism 17 and/or the securing mechanism 17 may comprise the ejection mechanism 29. For example, the latching mechanism 19 of an I/O module 10 illustrated in FIG. 8 may also function as an ejection mechanism 29 by pushing the I/O module out of the module slot 22 when the latch 191 is folded down as indicated by arrow 31.

Figure 11:
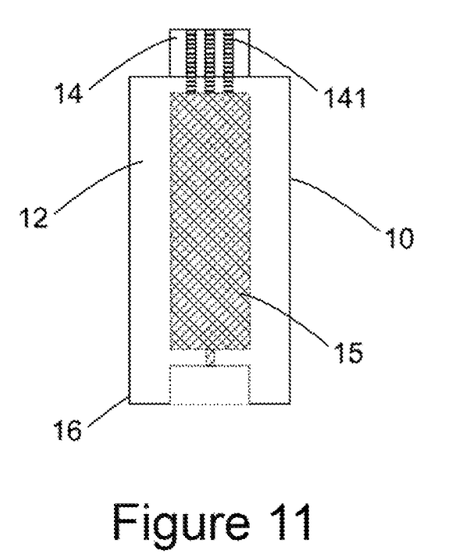
FIG. 11 shows a diagram of an example of a first connector and conversion circuitry of an example I/O module.

FIG. 11 shows a diagram of an example of a first connector 14 and electronic circuitry 15 of an I/O module 10. In some examples, an I/O module 10 may comprise electronic circuitry 15 electrically connecting the first connector 14 and the I/O port 16 to convert a signal received through the I/O port 16 or first connector 14. In some examples, the electronic circuitry 15 may further comprise circuitry to convert the signal received through the first connector 14 or I/O port 16 from a first signal format to a second signal format. In some examples the electronic circuitry 15 may further comprise circuitry to convert the signal received through the I/O port 16 or the first connector 14 between a signal for a pin arrangement of the I/O port 16 and a signal for a pin arrangement of the first connector 14. That is, the I/O module 10 may comprise electronic circuitry 15 to convert signals received at the I/O port 16 into signals suitable for reception at the electronic device 20 through the electrical connection between the first connector 14 and the second connector 24. The conversion circuitry 15 may also convert signals from the electronic device 20 (received through the electrical connection between the second connector 24 and the first connector 14) to signals suitable for transmission through the I/O port 16. As illustrated in FIG. 11, the first connector 14 may comprise pin arrangement 141 to electrically connect to corresponding pin arrangement 241 on a second connector 24. In some examples the electronic circuitry 15 may further comprise circuitry to convert the signal received through the I/O port 16 or the first connector 14 between a signal for the pin arrangement of the I/O port 16 and a signal for the pin arrangement 141 of the first connector 14.

Figure 12:
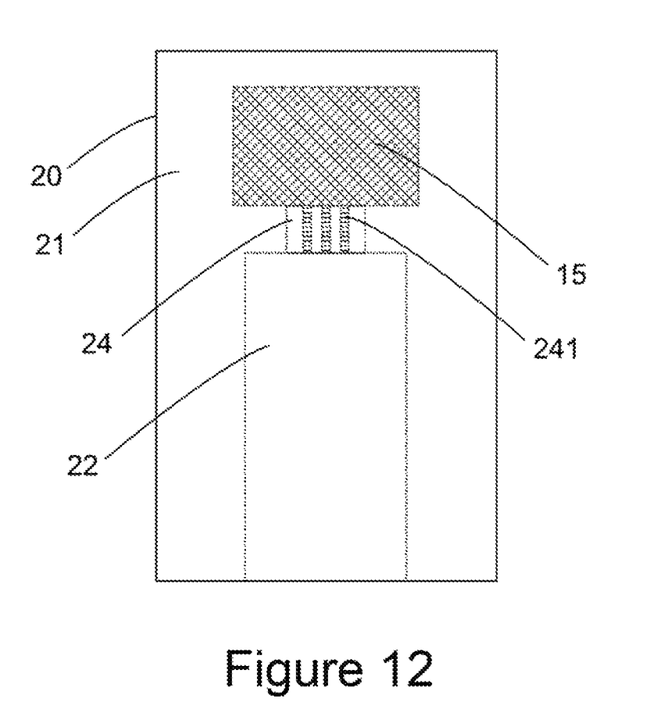
FIG. 12 shows a diagram of an example of electronic circuitry and an example second connector of an example electronic device.

It will be appreciated that electronic circuitry 15 may alternatively or additionally be implemented in the electronic device 20. FIG. 12 shows a diagram of an example of electronic circuitry 15 and an example second connector 24 of an example electronic device 20. In some examples, the electronic device 20 may comprise electronic circuitry 15 electrically connected the second connector 24 to convert a signal received from the second connector 24. The second connector 24 may comprise pin arrangement 241 to electrically connect to corresponding pin arrangement 141 on a first connector 14. If the electronic device 20 comprises a plurality of module slots 22, each second connector 24 may be electrically connected to its own electronic circuitry 15 or a plurality of second connectors may be electrically connected to the same electronic circuitry 15.

The first connectors 14 have been illustrated as male connectors and the second connectors 24 have been illustrated as a female connectors in the figures described above. The use of female connectors for the second connectors 24 in the module slots 22 may reduce the risk of a user damaging the connectors of the electronic device 20 or touching electrically live connectors. However, it will be appreciated that these illustrations and descriptions are merely examples. In some examples, some or all of the first connectors 14 may be female and some or all of the second connectors 24 may be male. The use of female connectors for the first connectors 14 may enable the I/O modules 10 to be more compact. The first connectors 14 and second connectors 24 may be any suitable connectors for enabling electrical connection between the electronic device 20 and the I/O port 16. In some examples the connectors may use existing connection standards, such as USB, Thunderbolt, or any other suitable connection technology, including any connection technologies developed in the future. Similarly, although the I/O ports 16 have been illustrated as female connectors in the figures above, it will be appreciated that some or a of the I/O ports 16 may be male connectors.

Figure 13:
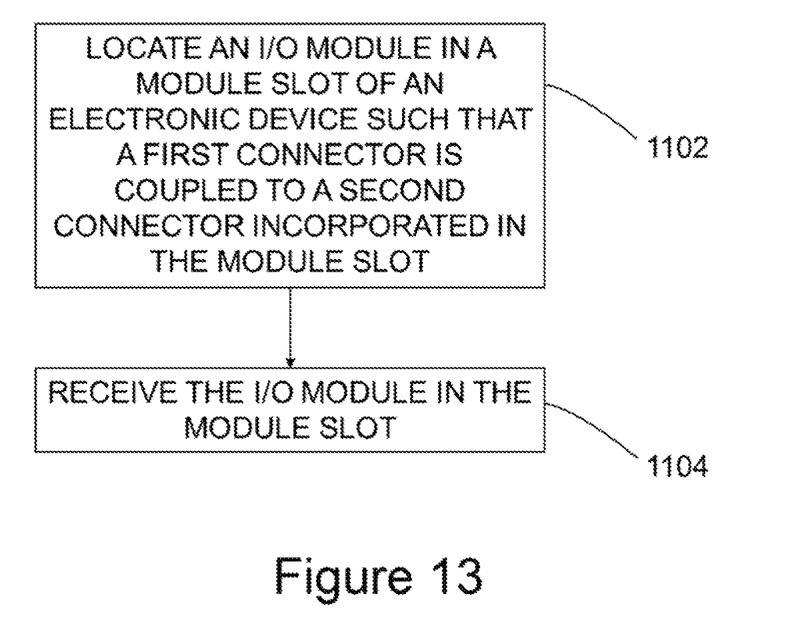
FIG. 13 shows a flowchart illustrating an example method.

FIG. 13 shows a flowchart illustrating a method according to some examples. The method begins at block 1102 by locating an I/O module 10 into a module slot 22 of an electronic device 20 such that a first connector 14 is coupled to a second connector 24 incorporated in the module slot 22. The method proceeds at block 1104 by receiving the I/O module 10 in the module slot 22, wherein the first connector 14 is disposed on a first part of the module body 12 of the I/O module 10, and is electrically connected to an I/O port 16 disposed on a second part of the module body 12, and the module slot 22 is disposed on a first part of a device body 21, and wherein coupling the first connector 14 to the second connector 24 electrically connects an I/O port 16 of the I/O module 10 to the electronic device 20. That is, a user may select I/O modules 10 with I/O ports 16 according to their needs, and install them in the electronic device 20. The I/O modules 10 may be easily removed and replaced with I/O modules 10 with different I/O ports 16 if the user's I/O needs change.

All of the features disclosed in this specification (including any accompanying claims, abstract, and drawings) may be combined in any combination, except combinations where at least some of such features are mutually exclusive.

Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. An input/output (I/O) module comprising:
   a module body having a shape corresponding to a shape of a module slot of an electronic device such that the I/O module is locatable in and is sized to fit entirely within the module slot;
   a first connector directly disposed on the module body without any intervening cable between the first connector and the module body; and
   an I/O port directly disposed on and flush with the module body and electrically connected to the first connector;
   wherein when the I/O module is located in the module slot, the first connector couples to a second connector in the module slot to electrically connect the I/O port to the electronic device, and the I/O port becomes flush with a surface of the electronic device at which the module slot is located.

2. The I/O module of claim 1, wherein the module body has a shape to fit a first type of module slot and to not fit a second type of module slot.

3. The I/O module of claim 1, further comprising:
   a securing mechanism to hold the I/O module within a module slot of an electronic device; or
   an ejection mechanism to eject the I/O module from a module slot of an electronic device.

4. The I/O module of claim 1, further comprising electronic circuitry electrically connecting the first connector and the I/O port to convert a signal received through the I/O port or the first connector.

5. The I/O module of claim 4, wherein the electronic circuitry comprises circuitry to convert the signal received through the I/O port or the first connector from a first signal format to a second, different signal format; or
   wherein the electronic circuitry comprises circuitry to convert the signal received through the I/O port or the first connector between a signal for a pin arrangement of the I/O port and a signal for a pin arrangement of the first connector.

6. An electronic device comprising:
   a device body; and
   a module slot disposed on a first part of the device body, the module slot incorporating a second connector,
   wherein an input/output (I/O) module having a module body with a shape corresponding to a shape of a module slot of an electronic device is locatable in and is sized to fit entirely within the module slot, a first connector of the I/O module is directly disposed on the module body without any intervening cable between the first connector and the module body, and an I/O port of the I/O module is directly disposed on and flush with the module body and electrically connected to the first connector,
   and wherein when the I/O module is located in the module slot, the first connector couples to the second connector in the module slot to electrically connect the I/O port to the electronic device, and the I/O port becomes flush with a surface of the electronic device at which the module slot is located.

7. The electronic device of claim 6, further comprising a plurality of module slots.

8. The electronic device of claim 7, wherein at least one module slot comprises a first type of module slot and at least one module slot further comprises a second, different type of module slot; and
   wherein the first type of module slot is shaped to receive a first type of module body of an I/O module; and
   wherein the second type of module slot is shaped to restrict insertion of the first type of module body.

9. The electronic device of claim 8, wherein both the first and second types of module slot are shaped to receive a second type of module body of an I/O module.

10. The electronic device of claim 6, further comprising:
a securing mechanism to hold an I/O module in the module slot; or
an ejection mechanism to eject an I/O module from the module slot.

11. The electronic device of claim 6, wherein the electronic device 20 further comprises electronic circuitry electrically connected to the second connector to convert a signal received from the second connector.

12. A method comprising:
locating an input/output (I/O) module in a module slot of an electronic device such that a first connector of the I/O module directly disposed on a module body of the I/O module without any intervening cable between the first connector and the module body is coupled to a second connector incorporated in the module slot to electrically connect an I/O port of the I/O module that is directly disposed on and flush with the module body and that is electrically connected to the first connector to the electronic device, the I/O port becoming flush with a surface of the electronic device at which the module slot is located; and
receiving the I/O module in the module slot, the module body having a shape corresponding to a shape of the module slot such that the I/O module is locatable in and is sized to fit entirely within the module slot.

13. The method of claim 12, further comprising:
actuating a securing mechanism to hold the I/O module within a module slot of an electronic device; or
actuating an ejection mechanism to eject the I/O module from a module slot of an electronic device.

* * * * *